United States Patent [19]

Meyers et al.

[11] Patent Number: 4,851,269

[45] Date of Patent: Jul. 25, 1989

[54] ANTIFLASHING ROLLCOAT COATINGS

[75] Inventors: Raymond E. Meyers, Strongsville; Albert S. Kukuca, Cleveland, both of Ohio

[73] Assignee: The Glidden Company, Cleveland, Ohio

[21] Appl. No.: 167,731

[22] Filed: Mar. 14, 1988

[51] Int. Cl.$^4$ ............................................. B05D 1/28
[52] U.S. Cl. .................................... 427/428; 427/386; 523/465; 525/120
[58] Field of Search ............... 427/428, 386; 523/465; 525/120

[56] References Cited

U.S. PATENT DOCUMENTS

| | | | |
|---|---|---|---|
| 4,046,931 | 9/1977 | Innes et al. | 427/428 |
| 4,332,713 | 6/1982 | Lehmann | 525/120 X |
| 4,378,390 | 3/1983 | Yoshida et al. | 427/428 |
| 4,601,918 | 7/1986 | Zaman et al. | 427/428 |

Primary Examiner—Shrive Beck
Attorney, Agent, or Firm—Thomas M. Schmitz

[57] ABSTRACT

Industrial high speed paint rollercoating processes are improved by the addition of wax particles to thermosetting rollercoatings. Wax particles having a particle size less than 50 microns and a softening point above 175° F. are dispersed into the rollercoating compositions to provide highly desirable antiflashing properties during the rollercoating process.

3 Claims, No Drawings

ANTIFLASHING ROLLCOAT COATINGS

BACKGROUND OF THE INVENTION

This invention relates to protective coatings and particularly to industrial rollercoating applied thermosetting coatings exhibiting antiflashing properties.

Industrial rollercoating is a high speed coating process where paint is continuously applied by a combination of rollers to continuous steel or aluminum coil or sheets passing through the rollers. Line speeds often reach 900 feet per minute. Organic coatings typically exhibit an uneven film thickness when applied by direct or indirect rollcoat at conventional substrate speeds through the rollercoat. This uneven film weight occurs in random areas of the substrate causing an unacceptable discontinuous coating condition known as "flashing." Flashing can be so severe in some situations that a sheet coated at 20 milligrams per 4 square inch substrate surface can have flashed surface areas accumulating 4 milligrams per 4 square inch. The flashed surface areas have little or no paint coating applied to the affected surface areas and hence provides insufficient protection to the substrate. Flashing can be reduced, but not eliminated by considerably reducing the rollercoater line speed and/or adding major amounts of solvent to reduce the coating viscosity to the point of undesirable dripping (25 seconds #4 Ford cup). However, these corrective procedures are counter-productive in that high line speeds and high solids (low VOC) are highly desired.

It now has been found that a rollercoater process and composition can be substantially improved to avoid flashing by including in the coating composition dispersed additive amounts of a solid wax particle having a particle size less than about 50 microns to provide a non-solubilized dispersion of wax particles within the coating composition. In addition to avoiding flashing, higher solids and higher viscosity coatings can be utilized in accordance with this invention. These and other advantages of the invention are realized and will become more apparent by referring to the detailed description and illustrative examples.

SUMMARY OF THE INVENTION

Briefly, the process of this invention is based on rollercoater paint coatings containing additive amounts of solid wax stably and uniformly dispersed within solvent based thermosetting coatings. The dispersed waxed partciles have a particle size less than 50 microns. The paint coatings preferably contain at least about 0.2% by weight solid wax based on the polymeric binder solids to prevent flashing during the rollercoating process.

DETAILED DESCRIPTION OF THE INVENTION

The rollercoating composition comprises a solvent based thermosetting polymeric binder containing additive amounts of a solid wax particle stably dispersed within the coating composition.

Referring first to the solid wax particles, the preferred waxes are solid particles at ambient temperatures having a particle size below 50 microns and an average particle size preferably between 2 and 50 microns. Suitable waxes include Carnauba montan wax, peat waxes, ozokerite and ceresin waxes, and petroleum waxes. Paraffin wax is a petroleum wax consisting principally of normal alkanes. Paraffin, microcrystalline, and semicrystalline waxes are useful depending on the congealing point of the wax. Preferred softening points of suitable wax particles should be above 175° F. and most preferably between 195° F. and 290° f. Preferred waxes for use as antiflashing additives in accordance with this invention comprise synthetic waxes such as polyethylene wax, Fischer-Tropsch waxes, chemically modified hydrocarbon waxes, and substituted amide waxes. Most preferred waxes are low molecular weight polyethylenes having waxlike properties and having a molecular weight less than about 10,000. Low molecular weight polyethylene waxes typically exhibit physical properties as follows:

| Wax | Melt point (ASTM D127) | Penetration (0.1 mm) (ASTM D1321) | | Viscosity @ 149° cP | Density @ 23° C. gm/cm |
| --- | --- | --- | --- | --- | --- |
| | | 25° C. | 60° C. | | |
| Allied A-C 6 polyethylene | 106 | 4 | 20 | 220 | 0.92 |
| BASF A polyethylene | 108 | 3 | 15 | 450 | 0.92 |
| Ciech WP-2 polyethylene | 110 | 3 | 15 | 200 | 0.93 |
| Epolene N-12 polyethylene | 110 | 1 | 9 | 220 | 0.94 |
| Hoechst PA 130 polyethylene | 125 | 1 | 4 | 320 | 0.93 |
| Leuna LE114 polyethylene | 115 | 2 | 7 | 260 | 0.93 |
| Paraflint H-1 polymethylene | 108 | 2 | 15 | 7 | 0.94 |
| Polywax 500 polyethylene | 86 | 7 | 61 | 3 | 0.94 |
| Polywax 2000 polyethylene | 125 | 1 | 2 | 50 | 0.96 |
| Veba A227 polyethylene | 108 | 2 | 10 | 200 | 0.93 |

Other useful low molecular weight synthetic polymeric waxes can include homomoners and copolymers ethylene, propylene, butadiene, and acrylic acid exhibiting waxlike properties similar to the polyethylene waxes and having a preferred melting point range between 195° F. and 290° F. Waxes are added in additive amounts of at least 0.2% and preferably between 0.5% and 2% by weight based on the thermosetting polymeric binder solids.

The useful polymeric binders comprise thermosetting high molecular weight epoxy resins. The epoxy resin component may be either an aliphatic epoxide resin or an aromatic epoxide resin. The most preferred epoxy resins are polyglycidyl ethers of bisphenol A, especially those having a number average molecular weight between 900 and 12,000 as measured by ASTM D3016-78; ASTM D 3536-76; or ASTM 3593-80.

Epoxy resins are characterized by the presence of a three-membered cyclic ether group commonly referred to as an epoxy group, 1,2-epoxide or oxirane. The most widely used epoxy resins are diglycidyl ethers of bisphenol A derived from bisphenol A and epichlorohydrin. In addition to bisphenol A, other starting materials such as aliphatic glycols and both phenol and o-cresol novolacs can be used to produce suitable epoxy resin. Liquid epoxy resins may be synthesized by a two-step reaction of an excess of epichlorohydrin to bisphenol A in the presence of an alkaline catalyst. The reaction consists initially in the formation of the dichlorohydrin of bisphenol A and further reaction via dehydrohalogenation of the intermediate with a stoichiometric quantity of alkali. Resins of higher molecular weight can be prepared by reacting Bisphenol A directly with epichlorohydrin in the presence of stoichiometric amounts of caustic, the molecular weight of the product being governed by the ratio of epichlorohydrinbisphenol. In the molecular weight advancement process, sometimes referred to as the fusion method, the liquid epoxy resin (crude diglycidyl ether of bisphenol A) is chain-extended with bisphenol A in the presence of a catalyst to yield higher polymerized products. The molecular weight of the resin is a function of the ratio of excess liquid epoxy resin to bisphenol A. The terminal groups are preponderantly epoxy groups. Since no by-products are generated, the advancement process is more convenient and can be used to prepare high molecular weight resins directly.

While it is sometimes convenient to use a finished epoxy resin at the desired molecular weight, it is often practical to start with bisphenol A and the bisglycidyl ether of bisphenol A, which is available from commercial sources. The bisglycidyl ether of bisphenol A, known in the industry as liquid epoxy resin, is available in precatalyzed form not only from Dow Chemical Company under the trade name DER containing as the catalyst the complex of ethyl triphenyl phosphonium acetate with acetic acid, but also from Shell Chemical Company under the trade name Epon and these are convenient initial starting materials. Uncatalyzed liquid epoxy resins are also available and have been found to be suitable for use when the proper catalyst is employed.

To increase the initial molecular weight of a liquid epoxy resin to a level that is more satisfactory for coating applications, the initial liquid epoxy resin may be reacted with additional bisphenol A or other polyfunctional aromatic alcohols which can be used to make glycidyl ether and to increase molecular weight.

Commercial epoxy resins that have useful molecular weight values and that are suitable for use as is, without further increase in molecular weight, include DER 662, 664, 667, 668, and 669, all solid epoxy resin products of Dow Chemical Company (with calculated average molecular weights, respectively, of 1,275; 1,850; 3,600; 5,500; and 9,000); and EPON 836,1007 and 1009, all products of Shell Chemical Company (with calculated average molecular weights, respectively, of 625 (semi-solid); 4,500; and 6,500).

The reactive epoxy polymer can be rendered thermosetting by coreaction with a crosslinking compound, including an aminoplast ir phenoplast or a glycoluril. Examples of useful aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes useful in this invention are formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of aminoplast resins are methylol urea, dimethoxymethylol urea, butylated polymeric urea-formaldehyde resins, hexamethoxymethyl melamine, methylated polymeric melamineformaldehyde resin and butylated polymeric melamineformaldehyde resin. Phenolplast resins, or phenol-aldehyde resins, are the reaction products of phenols and aldehydes which contain reactive methylol groups. These compositions can be monomeric or polymeric in nature depending on the molar ratio of phenol to aldehyde used in the initial condensation reaction. Useful phenolplast resins are polymethylol phenols wherein the phenolic group is etherified with an alkyl, e.g., methyl or ethyl group.

Glycoluril derivatives are disclosed in U.S. Pat. No. 4,064,191 and are also known as acetylendiureas. Glycolurils are derived by reacting two moles of urea with one mole of glyoxal to provide a complex ring structure illustrated as follows:

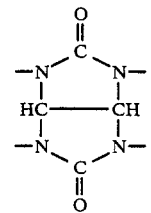

The substitutes constituents can be a hydrogen, or a lower alkyl radical, or can be methylolated partially or fully by reacting with 1 to 4 moles of formaldehyde to provide a methylol glycoluril. The preparation of various glycolurils are illustrated in U.S. Pat. No. 4,064,191 such as tetramethylol glycoluril, tetrabutoxymethyl glycoluril, partially methylolated glycoluril, tetramethoxymethyl glycoluril, and dimethoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, thetetramethylether of tetramethylol glycoluril, tetrakisethoxymethyl glycoluril, tetrakisisopropoxymethyl glycoluril, tetrakisbutoxymethyl glycoluril, tetrakisamyloxymethyl glycoluril, tetrakishexoxymethyl glycoluril and the like. Glycoluril derivatives can further include dimethylol dihydroxy ethylene urea.

On a weight basis, the matrix thermosetting polymers can comprise on a weight basis between about 5% and 40% crosslinking compound with the balance being coreactive high molecular weight epoxy resin. The thermosetting matrix polymers can be further solvated in organic solvents to provide a useful liquid composition where the solvated mixture can contain between 20% and 80% solvent. Useful organic solvents include oxygenated solvents such as ketones, esters, and ethers; aromatic solvents such as toluene and xylene; and simple alcohols such as isopropyl and n-butyl alcohol. Useful coatings often contain a combination of true solvents such as low boiling point ketones such as methyl ethyl ketone in combination with higher boiling point solvents such as cyclohexanol, Cellosolve acetate, or propylene substitute.

In producing the coating of this invention, the epoxy resin, crosslinking agent, and solvent can be mixed together to produce a uniform mixture of resin. The wax particles are then dispersed into the resin mixture to provide a uniform dispersion of wax particles throughout the resin mixtures. Pigments can be added if desired.

The merits of the antiflashing aspects of this invention are further illustrated by the following examples.

EXAMPLE 1

An epoxy resin rollercoating was produced as follows:

| Material | Grams |
| --- | --- |
| Dupont Dibasic Ester Solvent | 192 |
| Butanol | 297 |
| Xylene | 786 |
| Diacetone Alcohol (DAA) | 475 |
| Butylcellosolve | 1345 |
| Ethyl alcohol | 160 |
| PM Solvent | 328 |
| Butvar 1390 Polyvinyl Butyral | 38 |
| Varcum 5416 Phenolic | 558 |
| Epon 1007 Epoxy | 1235 |
| Epon 1009 Epoxy | 212 |
| MEK | 112 |
| Modaflow Defoamer, Polymer of 2 Ethylacrylate, 2 ethylhexylacrylate. | 2 |
| Phosphoric acid | 5 |
| Butanol | 287 |
| DAA | 119 |
| Beckamine Urea formaldehyde | 116 |
| Butyl cellosolve | 120 |

Note to inventor: Identify in chemical terminology all abbreviations and codes. Add detailed description of processing steps.

The foregoing rollercoat was modified as indicated in Table I and then applied to a cleaned steel sheet using a commercial rollercoater at 20 milligrams per 4 square inches substrate at a line speed of 100 sheets per minutes with the indicated result.

TABLE I

| | Additives | Results |
| --- | --- | --- |
| (a) | None. Reduced with mixed* solvent to a viscosity of 30-35 seconds *MEK 30% Xylene 30% Butylcarbitol 40% | Severe flashing |
| (b) | 1% polyethylene lube (Daniels Products) @ 30-35 seconds | No flashing |
| c) | 0.5% polyethylene wax lube @ 30-35 seconds | No flashing |

TABLE I-continued

| | Additives | Results |
| --- | --- | --- |
| (d) | 1% Fluorocarbon + hydrocarbon wax, i.e., polyethylene @ 30-35 seconds | No flashing |
| (e) | 3% Fluorocarbon + hydrocarbon wax, i.e., polyethylene @ 30-35 seconds | No flashing |
| (f) | 10% ethylene bis-stearamide @ 30-35 seconds | No flashing |

EXAMPLE 2

Epoxy resin rollercoats were produced in a manner similar to Example 1 from the following raw materials (Note add several formulas, if available.)

| Materials | Grams |
| --- | --- |
| Butyl alcohol | 145 |
| PM solvent | 110 |
| Diacetone alcohol | 48 |
| Solvesso 100 | 60 |
| Methyl isobutyl ketone | 29 |
| Denatured ethyl alcohol | 26 |
| MEK | 18 |
| Epon 1007 Epoxy | 228 |
| GE 75108 Phenolic | 38 |
| Phenodur Phenolic | 24 |
| Beetle 216-8 Urea | 81 |
| Additol XL690 Defoamer | 0.2 |

The foregoing compositions were tested in a manner similar to Example 1 and the results are given in Table 2.

TABLE 2

| Additives | Results |
| --- | --- |
| None reduced with mixed* solvent to a viscosity of 30-35 seconds | Severe flashing |
| 1.8% Ethylene Bis Stearamide @ 30-40" | No flashing |
| 2.0% Ethylene Bis Stearamide @ 30-40" | No flashing |
| 4.0% Ethylene Bis Stearamide @ 30-40" | No flashing |
| 6.0% Ethylene Bis Stearamide @ 30-40" | No flashing |
| 8.0% Ethylene Bis Stearamide @ 30-40" | No flashing |
| 10.0% Ethylene Bis Stearamide @ 35-40" | No flashing |

We claim:

1. In a process for rollercoating continuous feed coil or sheet metal at high speeds with a rollercoating composition, the improvement comprising:
   providing a thermosetting epoxy binder composition comprising a mixture of an epoxy resin having a number average molecular weight above 900 as measured by GPC an a crosslinking component adapted to crosslink with the epoxy resin upon heating;
   dispersing into the epoxy binder composition synthetic wax particles having a molecular weight between 1,100 and 10,000 and a particle size less than 50 microns to provide a rollercoating composition comprising a uniform dispersion of said wax particles in said epoxy binder; and
   rollercoating the roller coating composition onto coil or sheets without flashing to produce a uniform coating on the coil or sheets.

2. In the process in claim 1 where the particles of wax have an average particle size between 2 and 50 microns.

3. The process in claim 1 where the synthetic wax comprises polyethylene wax.

* * * * *